United States Patent [19]

Rydborn

[11] 4,140,919

[45] Feb. 20, 1979

[54] APPARATUS FOR THE SURVEILLANCE OF ONE OR MORE ELECTRICAL SIGNALS

[76] Inventor: Sten-Åke O. Rydborn, Klöxhultsvägen 21, Almhult, Sweden

[21] Appl. No.: 787,670

[22] Filed: Apr. 14, 1977

[30] Foreign Application Priority Data

Apr. 15, 1976 [SE] Sweden ............................. 7604457

[51] Int. Cl.$^2$ ............................................. H01H 83/00
[52] U.S. Cl. ................................ 307/116; 139/336; 340/677
[58] Field of Search ............................ 307/116, 117; 200/61.13–61.18; 340/259, 675, 677; 356/238; 250/548; 139/370.1, 336, 341, 342

[56] References Cited

U.S. PATENT DOCUMENTS 3,757,831  9/1973  Loepfe et al. ........................ 139/336

Primary Examiner—Robert K. Schaefer
Assistant Examiner—Morris Ginsburg
Attorney, Agent, or Firm—Beveridge, De Grandi, Kline & Lunsford

[57] ABSTRACT

Apparatus for monitoring one or more electric signals representing movement of objects such as threads, strips, or the like during one or more surveillance time periods. A first signal detector detects the electrical signals representative of the movement. A trigger-signal-generating circuit generates a trigger signal upon detection of an electrical signal of at least a predetermined magnitude. A second signal detector is responsive to trigger signals to activate a surveillance circuit which indicates detection of a moving object. The apparatus includes a device for increasing the sensitivity of one or both of the signal detectors during all or part of the surveillance period.

8 Claims, 12 Drawing Figures

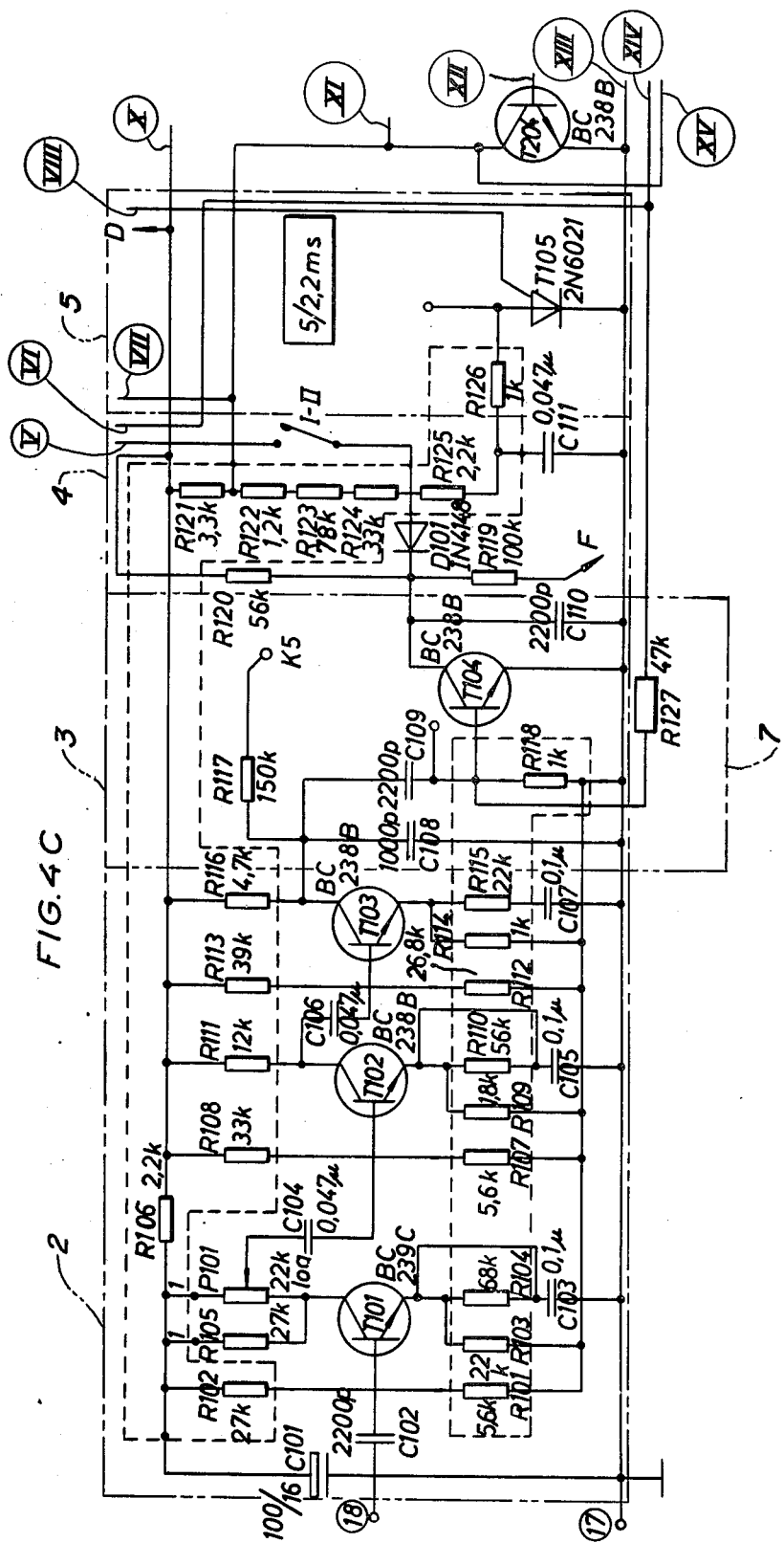

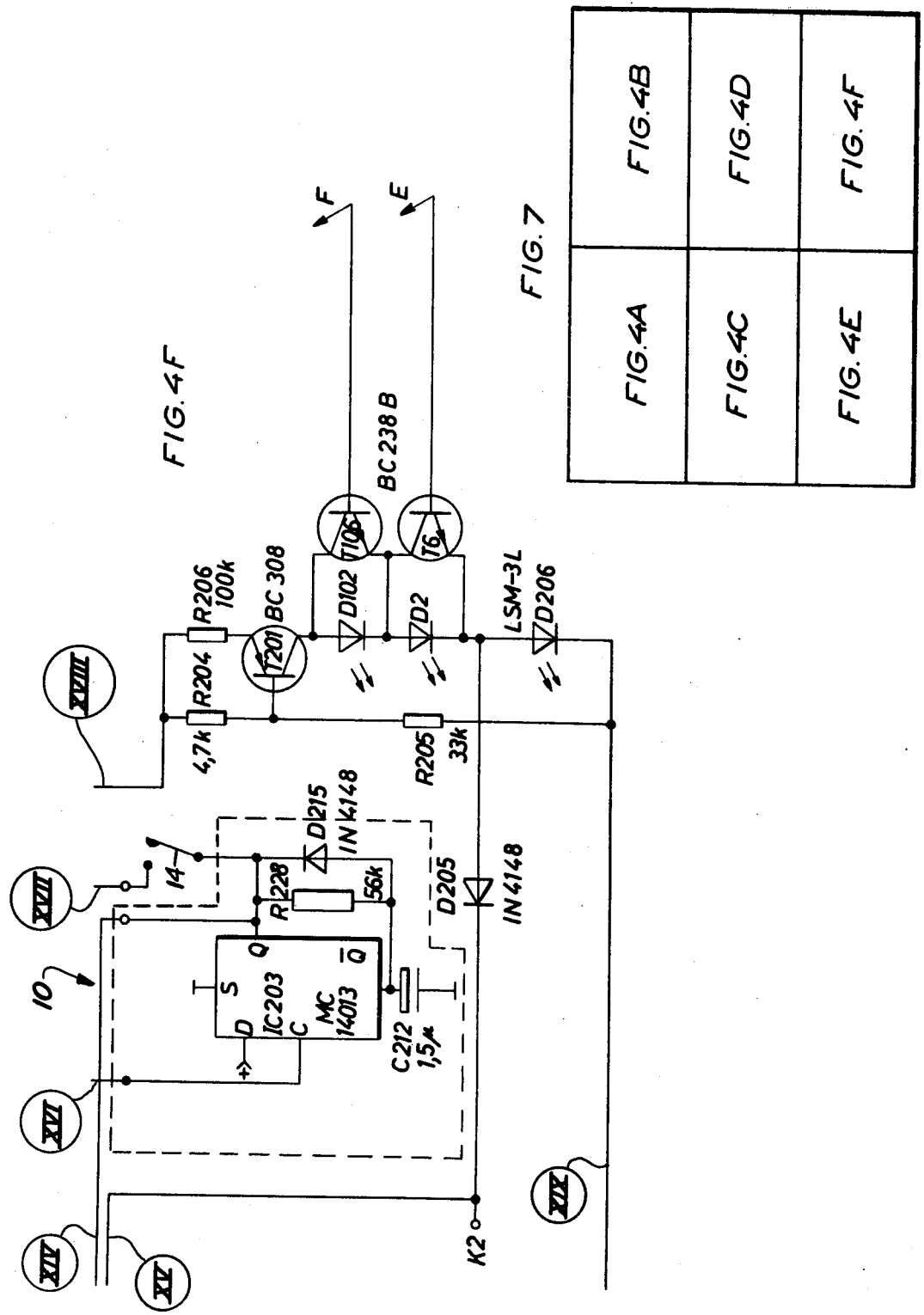

APPARATUS FOR THE SURVEILLANCE OF ONE OR MORE ELECTRICAL SIGNALS

The present invention relates to an apparatus for the surveillance of one or more electric signals representing the movements of objects, for example, threads, strips or the like, during one or more surveillance periods, the apparatus comprising a first signal detector for each signal coupled to a circuit producing a trigger signal, this circuit being in turn coupled to a surveillance circuit via a second signal detector.

In conjunction with the surveillance of the movement of objects, many problems occur which to a greater and greater extent require a solution. Thus, it is a desire in the art that it be possible to scan looms and stop the operation of a loom whenever a thread break occurs, even at a very late stage in the shuttle passage. Furthermore, it is a desire in the art to be able to prevent a thread breakage indication on the occurrence of jumping threads. In special looms with shuttles which are moved through the lease at a very high speed, it is necessary to ensure a certain thread surveillance period in order to prevent a false stop of the machine if a shuttle has had time to move through the lease before the surveillance period has commenced. Moreover, it is desirable to be able to detect and remove worn shuttles.

Thus, the object of the present invention is to realize a solution to at least the above-disclosed problems.

The apparatus according to the present invention comprises a device for increasing the sensitivity of detection during a whole or part of a surveillance period and/or after a surveillance period.

The nature of the present invention and its aspects will be more fully understood from the following description of the drawings, and discussion relating thereto.

Figure 3:
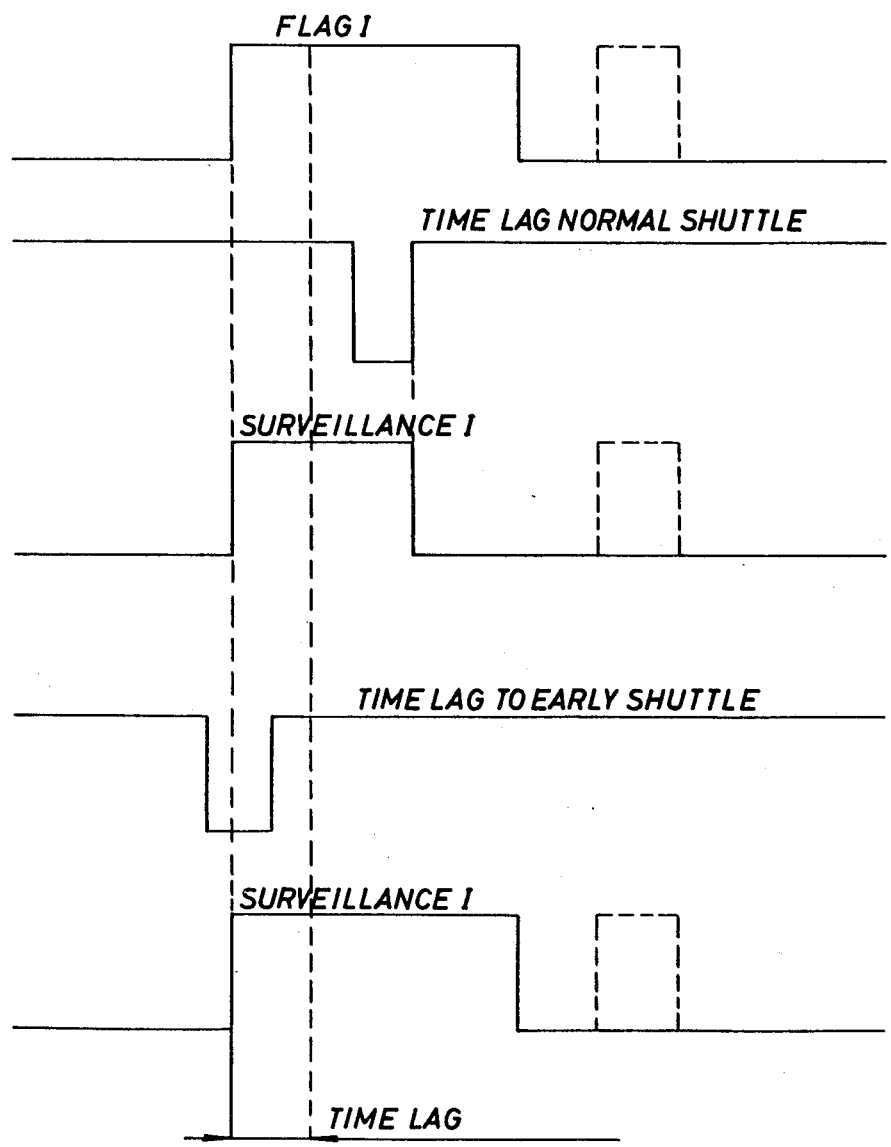
Figure 4A:
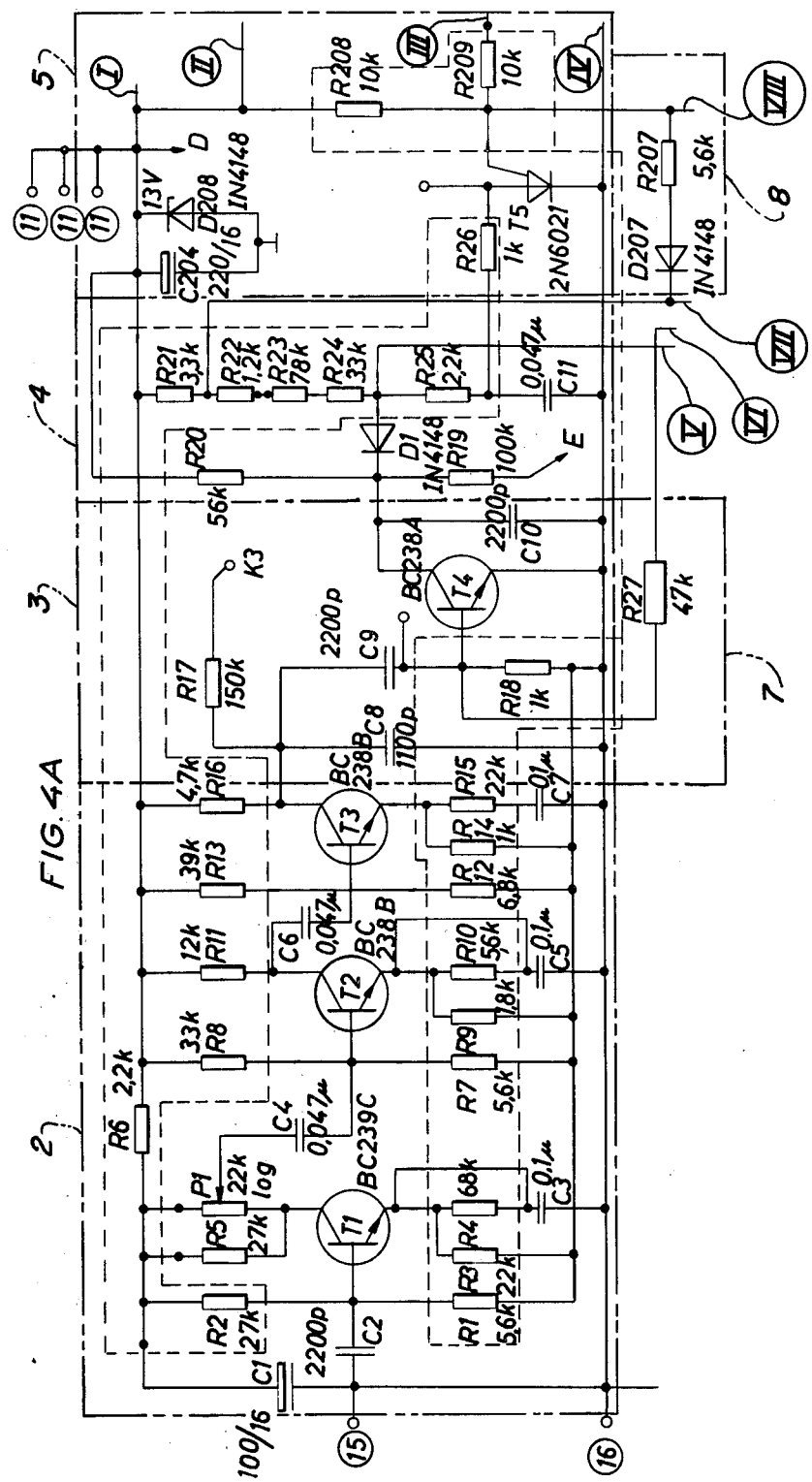
Figure 4B:
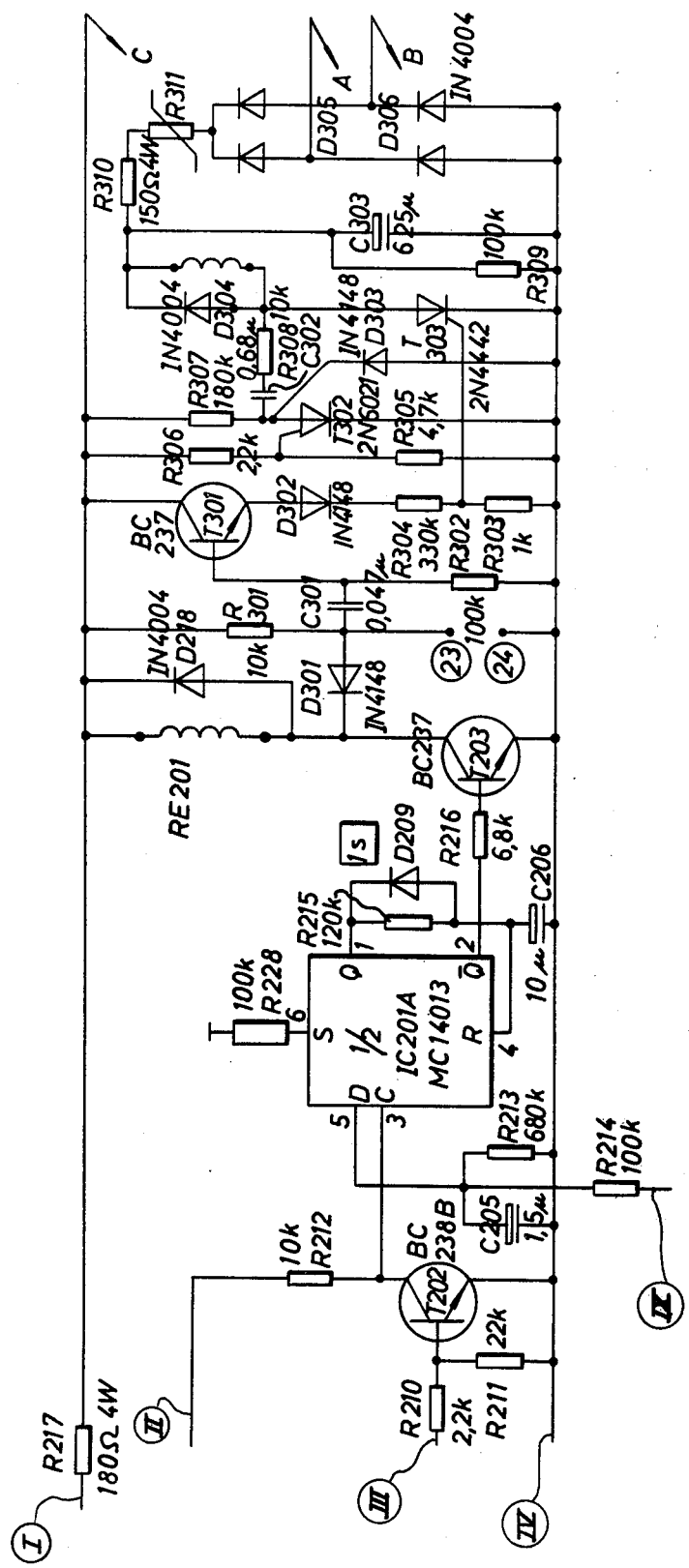
Figure 4D:
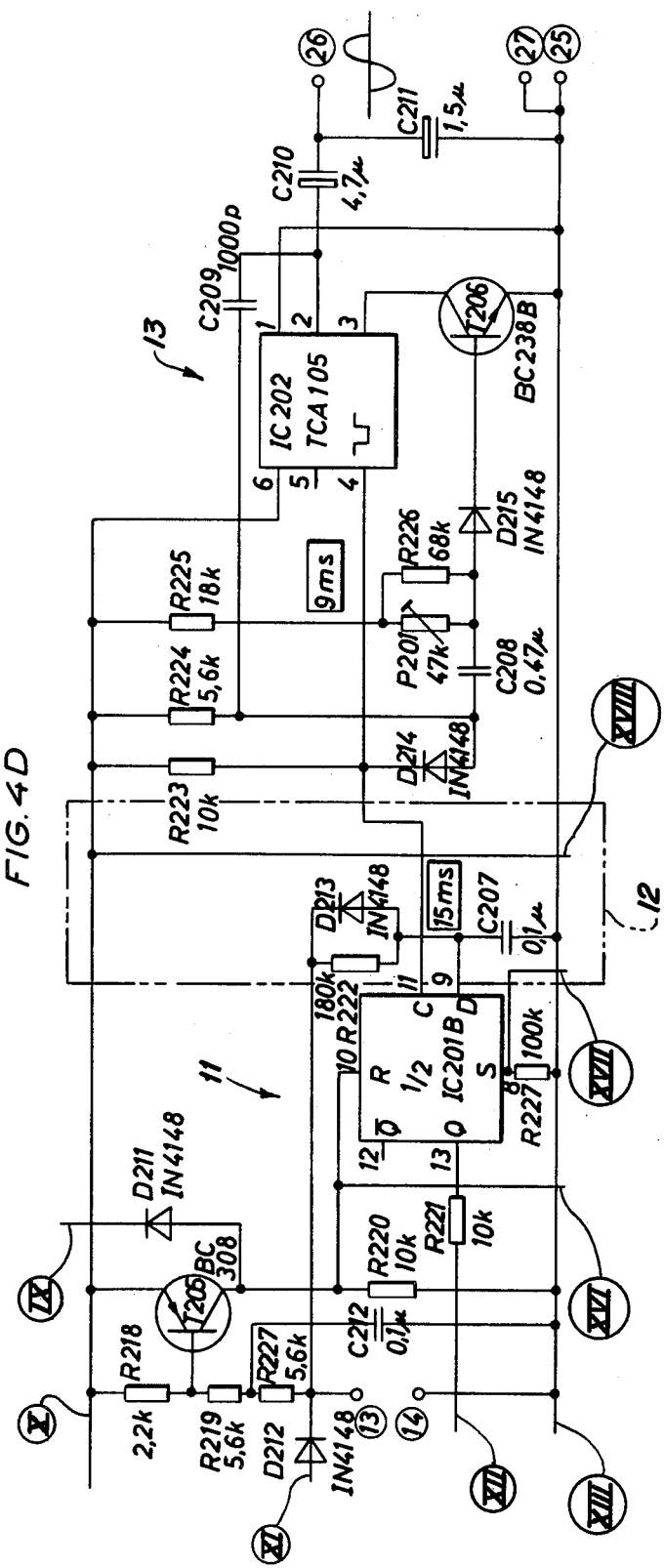
Figure 4E:
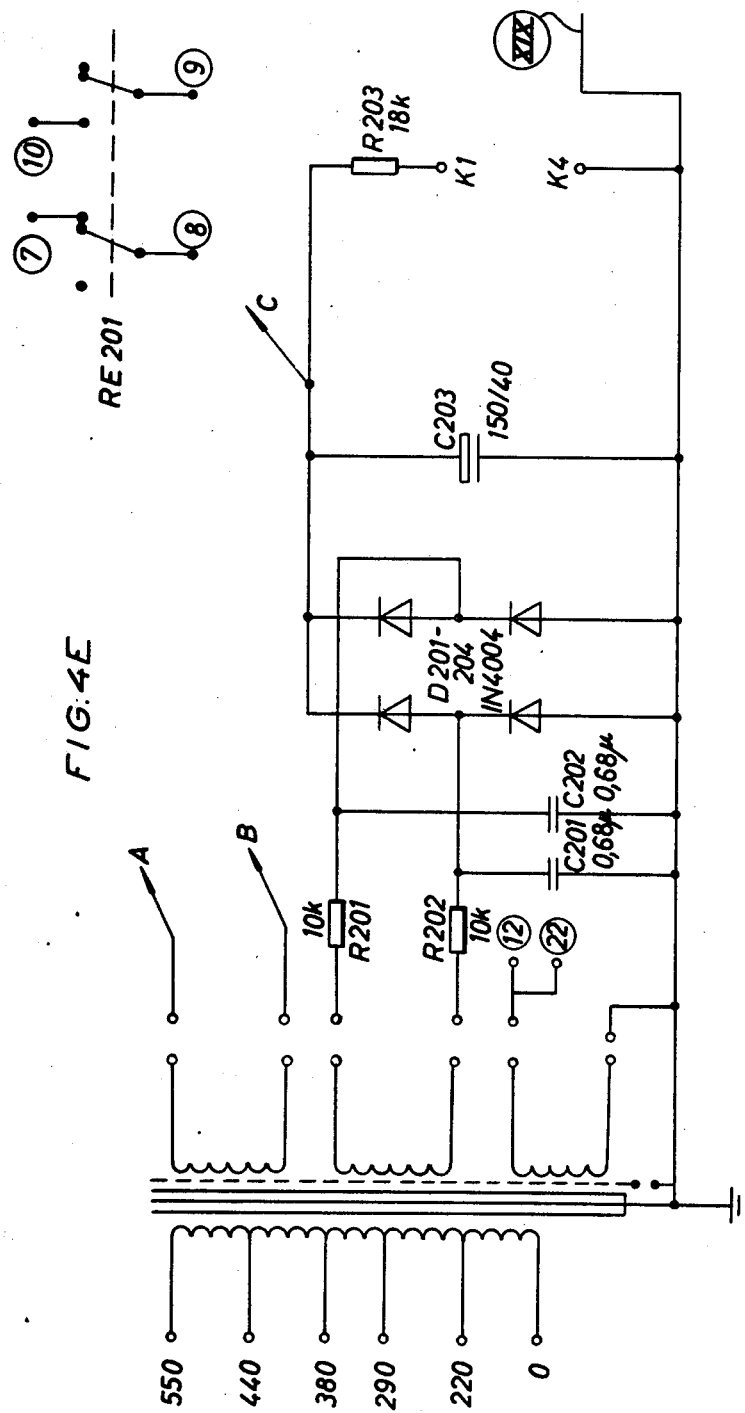

FIG. 3 is a diagram of pulses in the apparatus according to the present invention during a surveillance period upon the passage of a shuttle too early; and FIGS. 4A, 4B, 4C, 4D, 4E and 4F are schematic diagrams of various portions of the apparatus according to the present invention. When arranged as shown in FIG. 7, FIGS. 4A through 4F comprise a practical coupling diagram of the apparatus shown in the block diagram of FIG. 1.

Figure 5:
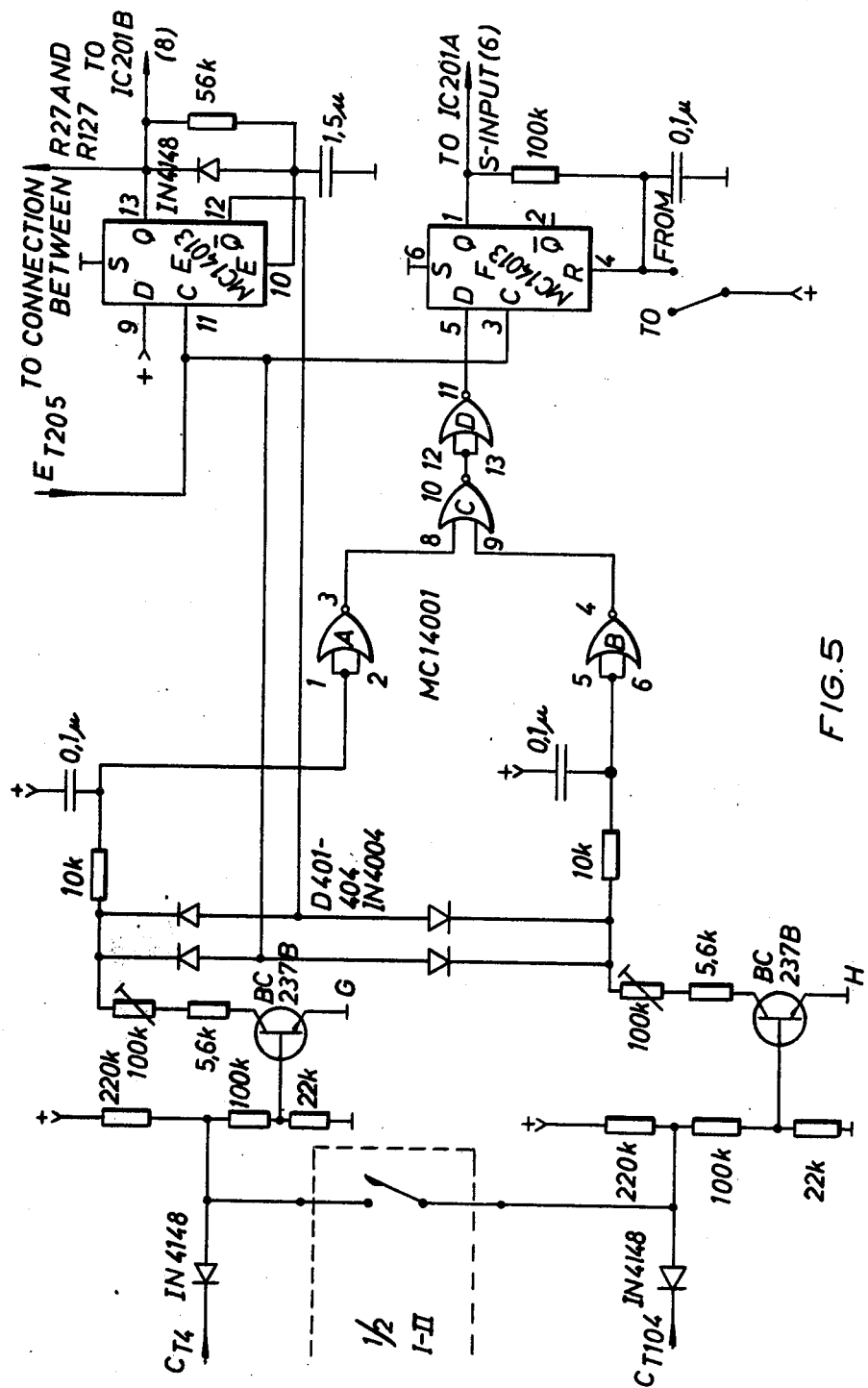

FIG. 5 is a practical coupling diagram of a modification of the part for checking of worn shuttles.

Figure 6:
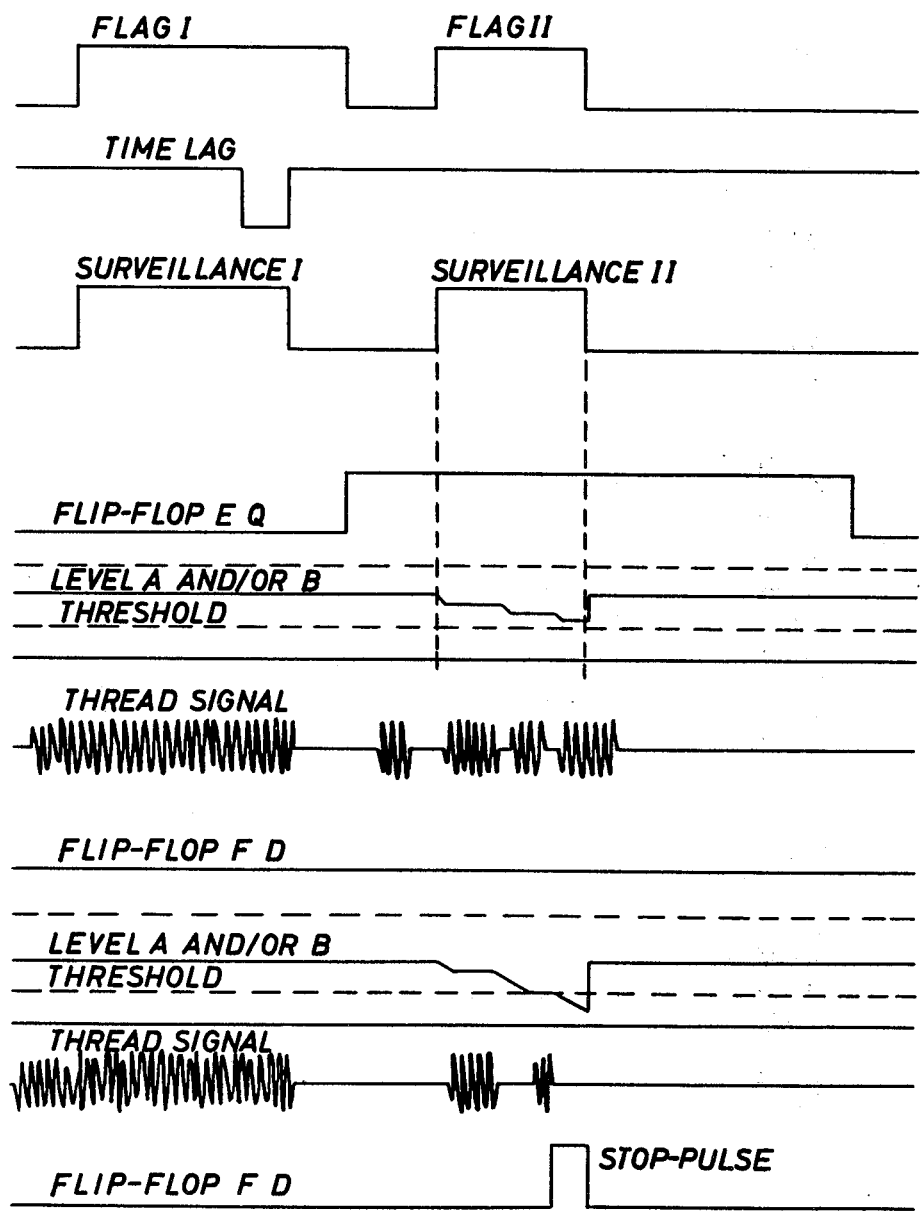

FIG. 6 is a diagram of pulses in the apparatus modified according to FIG. 5.

FIG. 7 is a diagram showing the positioning of FIGS. 4A - 4F to form FIG. 4.

Figure 1:
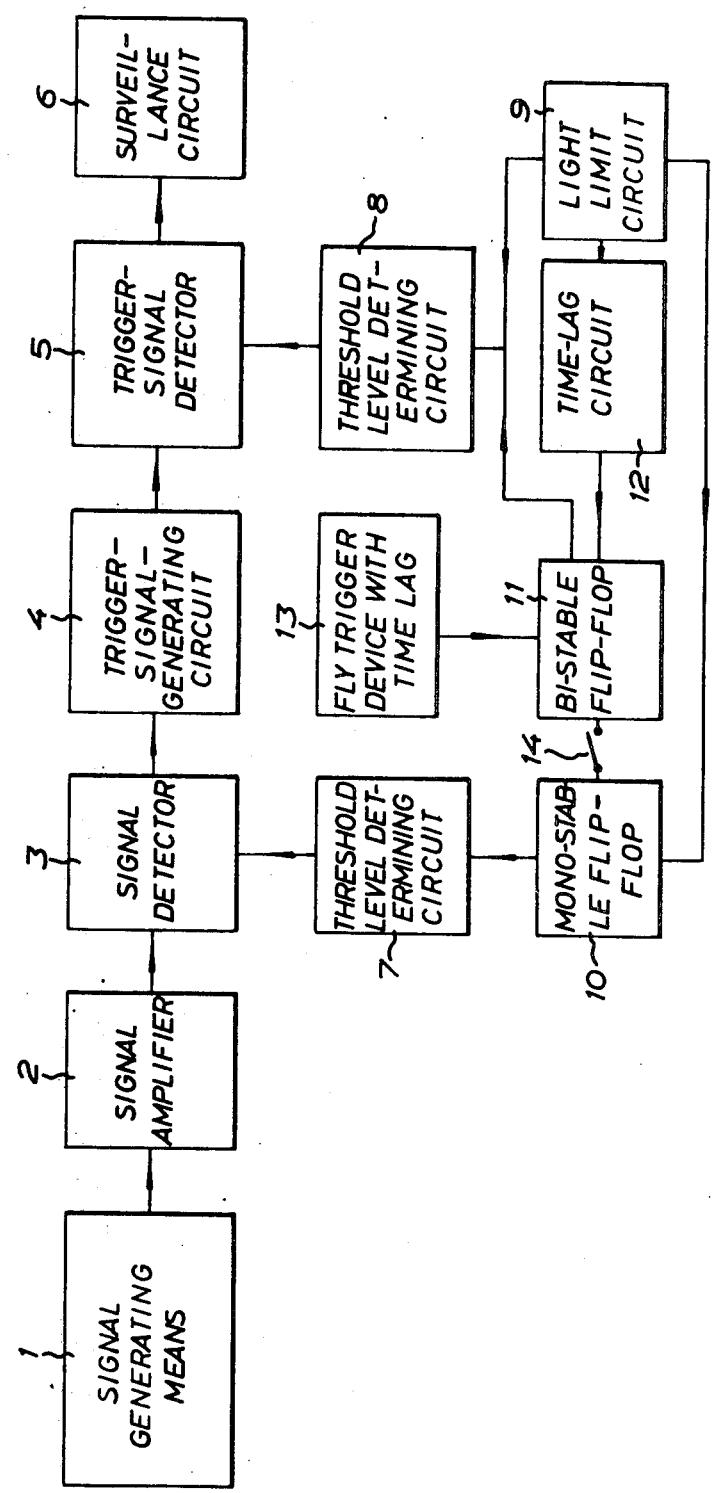
FIG. 1 is a block diagram of an apparatus according to the present invention.

According to FIG. 1, signal generating means 1 are coupled to a signal detector 3 via a signal amplifier 2. The signal generating means and the signal amplifier can be provided in one or several channels. The signal detector 3 is coupled to a surveillance circuit 6 via a trigger-signal-generating circuit 4 and a trigger-signal detector 5. The signal detector 3 is of the type which prevents generation of a trigger-signal in the trigger-signal-generating circuit 4 so long as the signal detector receives a signal from the signal amplifier 2 at a certain predetermined signal level. The trigger-signal-generating circuit 4 is of the type which, as soon as the signal detector 3 permits, commences to generate a trigger-signal, whereas the trigger-signal detector 5 is of the type which, as soon as the trigger-signal-generating circuit has a generated a signal at a certain predetermined level, reacts and causes the surveillance circuit 6 to indicate the occurrence of a trigger-signal and, as a rule, stops the operation of the loom, when the apparatus is mounted in such a loom. The two signal detectors 3 and 5 are each provided with a threshold level determining circuit 7 and 8, and circuits 7 and 8 are utilized for lowering the level to which the signal must have reached in order that the detectors 3 and 5 react, which entails that the sensitivity of the detectors is increased.

The period of time during which the signal or signals are to be monitored is determined by means of a light limit device or photodetector device 9 which is coupled to the threshold level determining circuit 7, via a mono-stable flip-flop circuit 10, to a bi-stable flip-flop circuit 11 via a time-lag circuit 12 and to the threshold level determining circuit 8. The bi-stable flip-flop circuit 11 is also coupled to the threshold level determining circuit 8. The bi-stable flip-flop circuit 11 is associated with a fly trigger device with a time-lag 13. Fly trigger device 13 initiates the flight or movement of the shuttles and, after a brief time lag, actuates bi-stable flip-flop 11. A switch device 14 is placed between the mono-stable flip-flop circuit 10 and the bi-stable flip-flop circuit 11.

Figure 2:
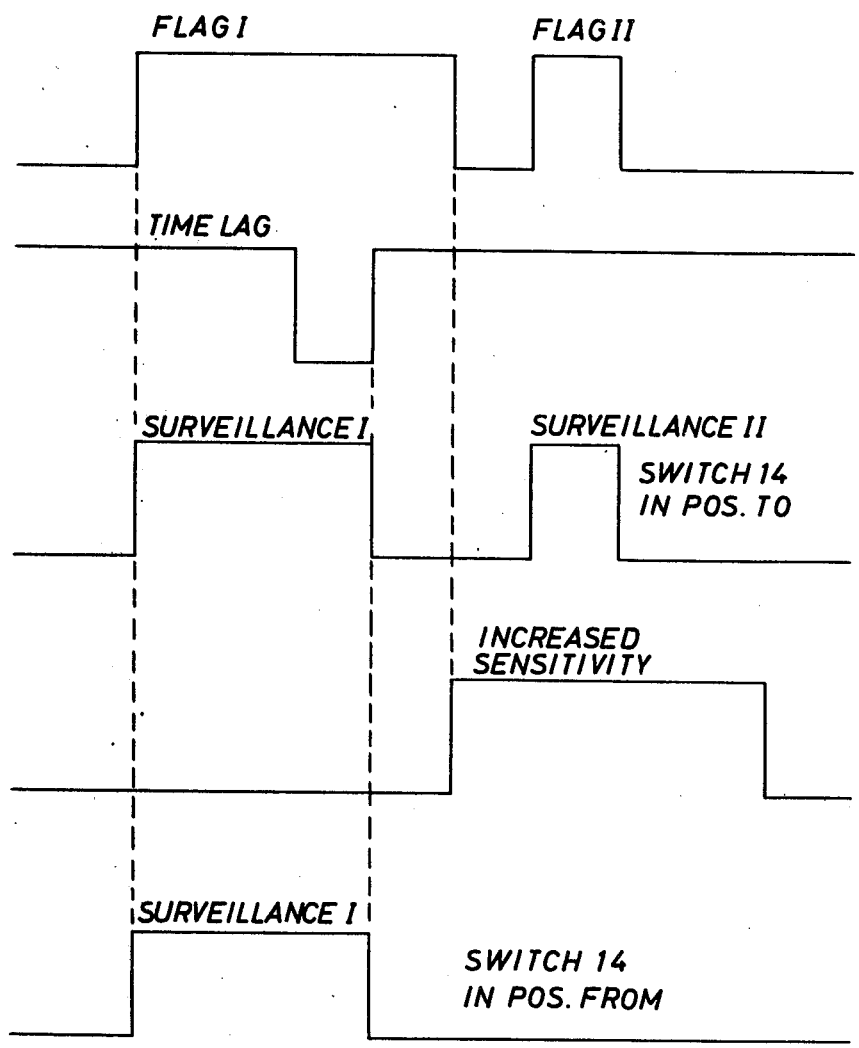
FIG. 2 is a diagram of pulses in the apparatus according to the present invention during checking of worn shuttles.

The method of operation of the apparatus according to the present invention will now be illustrated in conjunction with the block diagram in FIG. 1 and the coupling diagram in FIG. 4, as well as the pulse diagrams in FIGS. 2 and 3. The fly-trigger device on a loom is coupled to the connection points 25–27 and the circuit IC202 provides the time-lag. The bi-stable flip-flop circuit 11 consists of the circuit IC201B, and the mono-stable flip-flop circuit 10 consists of the circuit IC 203. The signal detector 3 consists of the transistor T4 and the trigger-signal detector 5 consists of a programmable unijunction transistor T5 and the trigger-signal-generating circuit 4 consists of a capacitor C11. In FIG. 4 is shown a two-channel device but the following description will relate only to one of the channels. The threshold level-determining circuit 7 can be considered as consisting of the resistor R27 and the connection to the Q-output from IC203. When that output is in its one state, the base voltage on the transistor T4 will increase in the present case from 0 to 270 mV, whereby the circuit sensitivity will double. This sensitivity increase takes place only during the withdrawal phase of the weft thread, in which case the signal from the signal-generating means is weaker than during the actual weft motion. This sensitivity increase may be switched off by means of the switch device 14.

Bi-stable flip-flop circuit 11, together with IC202, terminates the surveillance period when the shuttle has passed across the entire width of the weft. In certain cases, the shuttle may pass across the weft and land in the shuttle box so rapidly that the resultant surveillance period becomes minimal. In order to guarantee a minimum surveillance period, the time-lag circuit 12 has been provided between the circuit 11 and the device 9 which is coupled to the connection points 13 and 14. The time-lag circuit 12 consists of R222 and C207. These components are coupled to the data-input of the IC-circuit and prevent switching of the bi-stable flip-flop circuit 11 until the data-input has reached a level which in the present case occurs at half of the supply voltage 13 V. With the disclosed component values this time-lag will be about 15 milliseconds.

At the end of each surveillance period, the threshold level determining circuit 8 is caused to increase the sensitivity of the detector 5. The threshold level determining circuit 8 consists of the components D207 and R207 which lower the voltage on the controls to T5 and T105 whose operating voltage is normally determined by the components R208, R209, R210, R211 and R202. Because of the lowering of the voltage on the controls, these components will be conductive at a lower voltage on the anode than normal. In order that the detector 5 detect a trigger-signal, the capacitor C11 need not, thus, be charged to the same high level as under normal surveillance. Because of this lowering of the voltage on the controls, it is, thus, possible to say that the charge voltage of the capacitor C11 is controlled at the end of each surveillance period.

The apparatus according to the invention described above can advantageously be used for ascertaining shuttles with a worn thread terminal. This is effected after switching of the switch 14 to the open state. In this case, the light limit 9 is provided with two flags corresponding with two mutually subsequent surveillance periods. During the first surveillance period the thread is checked during the actual throw, when the shuttle is moved through the lease from one side to the other, and during the second surveillance period, the thread is withdrawn and checked to determine whether thread is withdrawn from the thread supply. If the shuttle terminal releases the thread during this withdrawal of thread from the thread supply, no signal will be obtained, whereby the loom will stop and the faulty shuttle can be replaced by a new. A possible signal during the second surveillance period is relatively weak and, therefore, use is made of the mono-stable circuit 10 for increasing the sensitivity of the detector 3 during only the second surveillance period. In order that the circuit 10 be switched and display a 1 on the output, a first surveillance period must have been terminated by means of the light limit device 9. In the present case, switching of the circuit 10 is obtained at the trailing edge of the first flag. According to the present invention, removal and replacement of worn shuttles is, thus, made possible.

In FIGS. 5 and 6 is shown a modification of the part of the apparatus according to the present invention which part is used to ascertain worn shuttles. This modification is a detector integrating signal which drop-outs during the second surveillance period. In FIG. 4F IC 203 and the parts connected thereto and surrounded by dashed lines are replaced with the circuit shown in FIG. 5. In FIG. 5 unconnected terminals should be connected in FIG. 4 as marked e.g. $C_{T4}$ means the collector of the transistor T4 etc. The switch I-II in FIG. 4 for switching between one and two channels should be replaced by a double switch. By this modification the input S6 of the circuit IC 201 A should as shown in FIG. 4 be connected to the chassie via a resistor R 228. Without the modification the resistor may be cancelled.

The NOR-gates A-D provide a NAND-gate in which A and B are threshold detectors. F is a bi-stable flip-flop circuit for providing a stop pulse. The transistors G and H become conducting when no signal is obtained, and the capacitors connected to A and B respectively will be charged and the voltage level at A or B will decrease. If said voltage level decreases under the threshold level as seen in FIG. 6, the input D of the IC-circuit F will be one. When the second flag terminates the second surveillance period, F receives a clock pulse and provides a stop pulse on the output Q. This stop pulse will stop the loom via the input S6 of IC 201 A and the faulty shuttle can be replaced. The pulse diagram in FIG. 6 shows the operation of this modification. As seen in FIG. 6, during the second surveillance period some signal drop-outs are allowed and integrated without passing the threshold, but when the signal drop-outs are exceeding a desired amount the threshold is passed and a stop pulse is generated for the stopping of the loom and replacement of the shuttle.

I claim:

1. Apparatus for monitoring one or more electric signals representing movements of objects such as threads, strips or the like during one or more surveillance time periods, the apparatus comprising a first signal detector for detecting each movement electrical signal to be monitored, a trigger-signal-generating circuit coupled to said first signal detector for generating a trigger signal upon detection of a movement electrical signal of at least a predetermined magnitude, a surveillance circuit for indicating detection of a moving object, a second signal detector coupling said trigger-signal-generating circuit to said surveillance circuit for activating said surveillance circuit upon generation of a trigger signal to indicate detection of a moving object, and means including a device for increasing the sensitivity of at least one of the first and the second signal detectors during at least a portion of the time of a surveillance period and the time after a surveillance period.

2. Apparatus as claimed in claim 1, further comprising a surveillance period determining device in the form of an electronic light limit device having flag means for terminating each surveillance period.

3. Apparatus as set forth in claim 2, wherein said surveillance period determining device further includes a bi-stable circuit with a re-set input coupled for resetting at the end of a surveillance period, a clock pulse input coupled to a circuit cutting-off said surveillance period and a further input coupled for switching of the circuit on commencement of a surveillance period.

4. Apparatus as set forth in claim 3, further comprising a time-lag circuit coupled to said clock pulse input for ensuring the surveillance period has at least a preset minimum duration.

5. Apparatus as set forth in claim 3 wherein the sensitivity increasing device includes a mono-stable circuit having a clock pulse input coupled to the device determining said surveillance period, for, at the end of said surveillance period, increasing the sensitivity thereof.

6. The apparatus as set forth in claim 5, further comprising switch means coupling the output of said mono-stable circuit to the switch input of said bi-stable circuit for impressing the output of said mono-stable circuit on said switch input and thereby preventing a further surveillance period.

7. The apparatus as set forth in claim 2, wherein said sensitivity-increasing device includes a circuit portion between said device determining said surveillance period and said second signal detector for increasing the sensitivity thereof after said surveillance period.

8. Apparatus as set forth in claim 1 wherein the apparatus comprises a circuit integrating signal drop-outs during a surveillance period and providing a signal for the trigger-signal-generating circuit when the integrated signal drop-outs pass a threshold.

* * * * *